(12) United States Patent
Flynn (10) Patent No.: US 6,198,785 B1
(45) Date of Patent: *Mar. 6, 2001

(54) AUTOBAUD RATE DETECTION AND ADJUSTMENT

(75) Inventor: Roger W. Flynn, Branchburg, NJ (US)

(73) Assignee: Lucent Technologies Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/939,417

(22) Filed: Sep. 29, 1997

(51) Int. Cl.⁷ .................................................. H04L 23/00
(52) U.S. Cl. ............................................................ 375/377
(58) Field of Search .................................... 375/377, 370, 375/225, 354, 222, 220, 260, 349, 358; 370/252, 468, 470

(56) References Cited

U.S. PATENT DOCUMENTS

| | | | |
|---|---|---|---|
| 4,101,732 | * 7/1978 | Suzuki | 178/53.1 |
| 4,761,763 | * 8/1988 | Hicks | 364/900 |
| 4,761,800 | 8/1988 | Lese et al. | 375/370 |
| 4,890,316 | * 12/1989 | Walsh et al. | 379/98 |
| 5,008,902 | 4/1991 | Key et al. | 375/225 |
| 5,072,407 | 12/1991 | Gutz et al. | 395/200.76 |
| 5,367,541 | 11/1994 | Barbero | 375/354 |
| 5,490,209 | 2/1996 | Kennedy et al. | 379/93.08 |
| 5,627,858 | * 5/1997 | Mak et al. | 375/225 |

* cited by examiner

*Primary Examiner*—Chi H. Pham
*Assistant Examiner*—Khai Tran
(74) *Attorney, Agent, or Firm*—Gibbons, Del Deo, Dolan, Griffinger & Vecchione (57) ABSTRACT

A data communication device includes a controller and a baud rate generator, which is initially set to receive a data stream at the highest baudrate. In response to a start bit in the data stream, the controller suspends the operation of the baud rate generator and determines the proper baudrate by polling for the presence or absence of the start bit. During the suspended period, the baud rate generator is set to the actual incoming baudrate. The baud rate generator is then turned on, and the rest of the characters are then received at the actual baudrate. The device utilizes the execution times of background processing instructions to serve as the polling times. As such, loss of data bits are prevented since all baudrate determinations are completed during the receipt of the start bit.

29 Claims, 4 Drawing Sheets

AUTOBAUD RATE DETECTION AND ADJUSTMENT

FIELD OF THE INVENTION

This invention relates to the field of communications and in particular, to baudrate detection and adjustment between communication devices.

BACKGROUND OF THE INVENTION

Serial data communication devices are capable of transmitting and receiving data between various destinations at multiple data rates or baudrates. For example, modems normally operate at baudrates of 2400, 4800, 9600 and higher. Since communication devices can operate at any one of these various baudrates, there must be a method for selecting the baudrate that is being utilized by the destination device. This synchronization is required for the proper transfer of the data from one device to another. In some devices, the required baudrate is selectable by the user. A drawback of this method is that the user has to know the baudrate being used by the connecting device.

Autobauding is an alternative method for automatically determining and setting the correct baudrate at the serial data communication device. Some early devices employed circuitry which recognized the zero slope points of the received analog waveform and varied the transmission rates based on the presence or absence of information. However, these devices were not accurate. Most autobauding techniques measure the duration or width of a start bit. This method requires that the data stream be initially sampled at the highest possible bit rate. Then, by counting the number of zero bits read, the data rate is determined. A disadvantage of prior art methods using variants of this technique is that the character used for detection is lost. Moreover, prior art software-based methods are difficult to implement at speeds greater than 19.2 kbits per second.

Other prior art methods compare the incoming received data bits to a reference character by stepping through the different baudrates until no errors are present. However, these schemes also appear to lose some of the initial bits while trying to ascertain the baudrate. Some prior art devices utilize alternative hardware configurations to detect and determine the correct baudrate. However, the cost of additional hardware is expensive when dealing with thousands of modems.

Accordingly, there is a need to provide a simple and effective device and method which does not require additional hardware and can autobaud without loss of data bits.

SUMMARY OF THE INVENTION

The present invention teaches an apparatus and method for autobauding which utilizes firmware to automatically detect and adjust to the incoming baudrate from a data terminal. This method measures the width of the start bit but importantly, the present invention sets the proper baudrate without the loss of any characters in the data stream.

In an exemplary embodiment of the present method, a data communication device includes a controller and a baud rate generator, which is initially set to receive a data stream at the highest baudrate. In response to a start bit in the data stream, the controller suspends the operation of the baud rate generator and determines the proper baudrate by polling for the presence or absence of the start bit. During the suspended period, the baud rate generator is set to the actual incoming baudrate. The baud rate generator is then turned on, and the rest of the characters are then received at the actual baudrate. Importantly, the method of the present invention advantageously utilizes the execution times of background processing instructions to serve as the polling times. As such, the present invention prevents the loss of data bits since all baudrate determinations are completed during the receipt of the start bit.

Advantageously, a non-preemptive interrupt processor is utilized to detect the presence of the start bit, cause suspension of the baud rate generator and determine the actual baudrate. As such, the method and apparatus of the present invention can be utilized in any serial data communication device. The above factors make the present invention a versatile and efficient method and device for autobauding in data communication devices.

BRIEF DESCRIPTION OF THE DRAWINGS

A more complete understanding of the present invention may be obtained from consideration of the following description in conjunction with the drawings in which.

DETAILED DESCRIPTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIGS. 1–4 may be provided by a single shared processor. (Use of the term "processor" should not be construed to refer exclusively to hardware capable of executing software.)

Illustrative embodiments may comprise microprocessor and/or digital signal processor ("DSP") hardware, firmware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

In general, the present invention automatically detects and adjusts to the incoming baudrate from a data terminal. A data communication device includes a processor and a baud rate generator, which is initially preloaded to receive data at the highest baudrate. In response to a start bit in the data, a non-preemptive interrupt processor in the processor suspends the operation of the baud rate generator and determines the proper baudrate by polling for the end of the start bit. The polling intervals are determined in coordination with the execution times of instructions performed for background processing. At baudrates lower than 38.4 kbits/ sec, a timer measures the actual incoming baudrate. Once the actual rate is determined, the baud rate generator is set to that rate. The baud rate generator is then turned on, and the rest of the characters are then received at the actual baudrate. No loss of data occurs since all baudrate determinations are completed during the receipt of the start bit.

Figure 1:
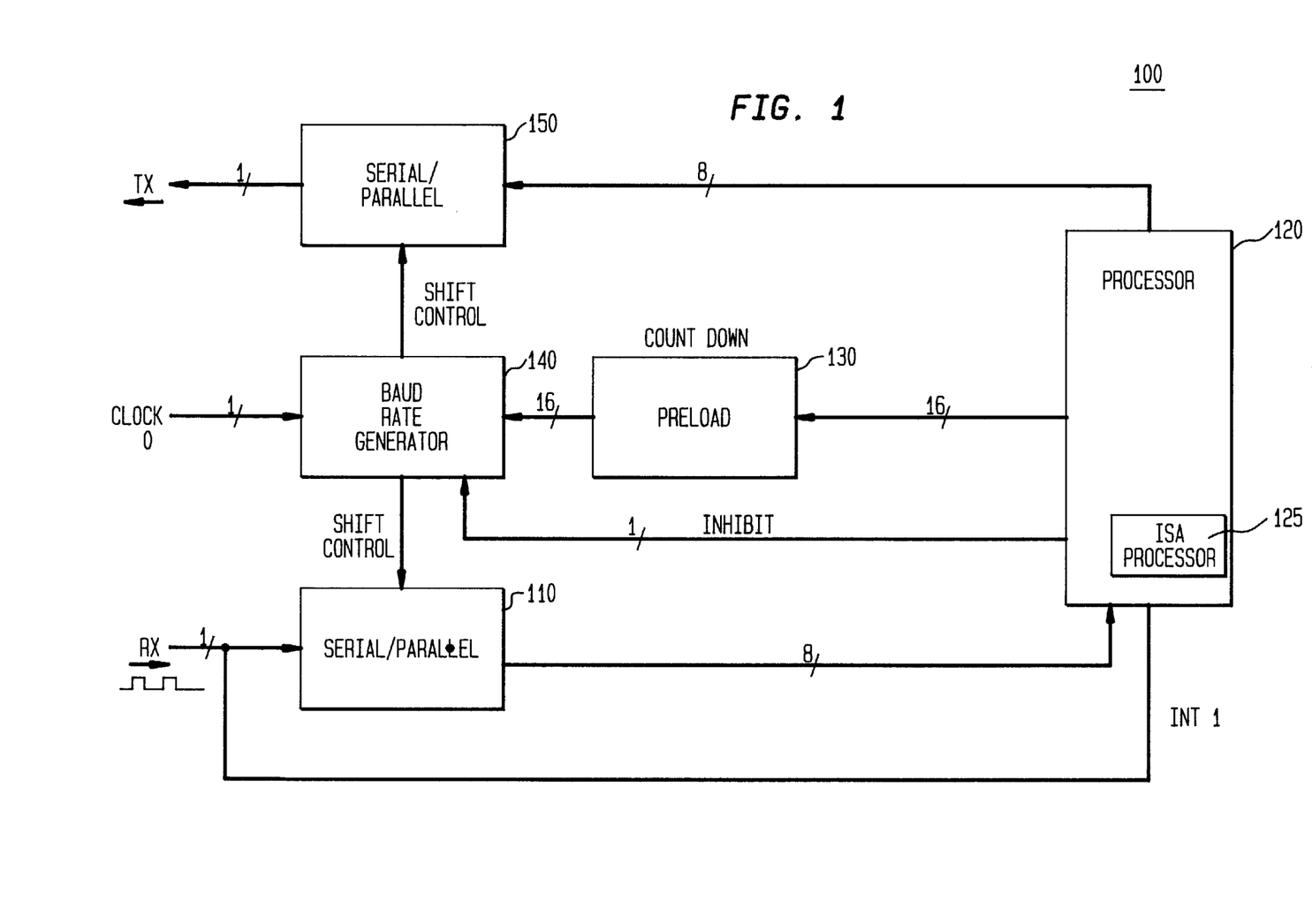
FIG. 1 is a block diagram of a data communication device in accordance with the present invention.

Referring to FIG. 1, an exemplary data communication device 100 is shown in accordance with the present invention. Data communication device 100 includes a receive serial-to-parallel register 110, a processor/controller 120, a preload register 130, a baud rate generator (BRG) 140 and a transmit serial-to-parallel register 150. Processor 120 includes a interrupt service routine (ISR) processor 125. In an exemplary embodiment of the present invention, data communication device 100 is a serial modem. However, data communication device 100 is meant to include all data communication equipment which utilizes the above elements. Although the discussions which follow sometimes reference specific microcontrollers and the Hayes AT command set, other standard devices and command sets are utilizable in implementing the present invention.

Functionally, BRG 140 controls the rate at which serial-to-parallel register 110 receives data and the rate at which serial-to-parallel register 150 transmits data. It is initially set at the highest baudrate through preload register 130. BRG 140 is a variable baud rate generator that is switchable between an off and on state by firmware (ISR processor 125 and processor 120) in such a manner that the internal state of the receiving channel hardware is not affected and is essentially frozen by the switching off action. This allows the start bit of a character to be attained at the highest baudrate and then the state of the hardware suspended while a lower rate start bit is clocked in or measured by the firmware. Once the actual baudrate is determined by the firmware, BRG 140 is set to that rate and turned back on so that the rest of the bits of the character are received at the newly set lower baudrate. That is, the start bit is always ascertained at the highest baudrate and the rest of the character is received at the actual baudrate.

Figure 2:
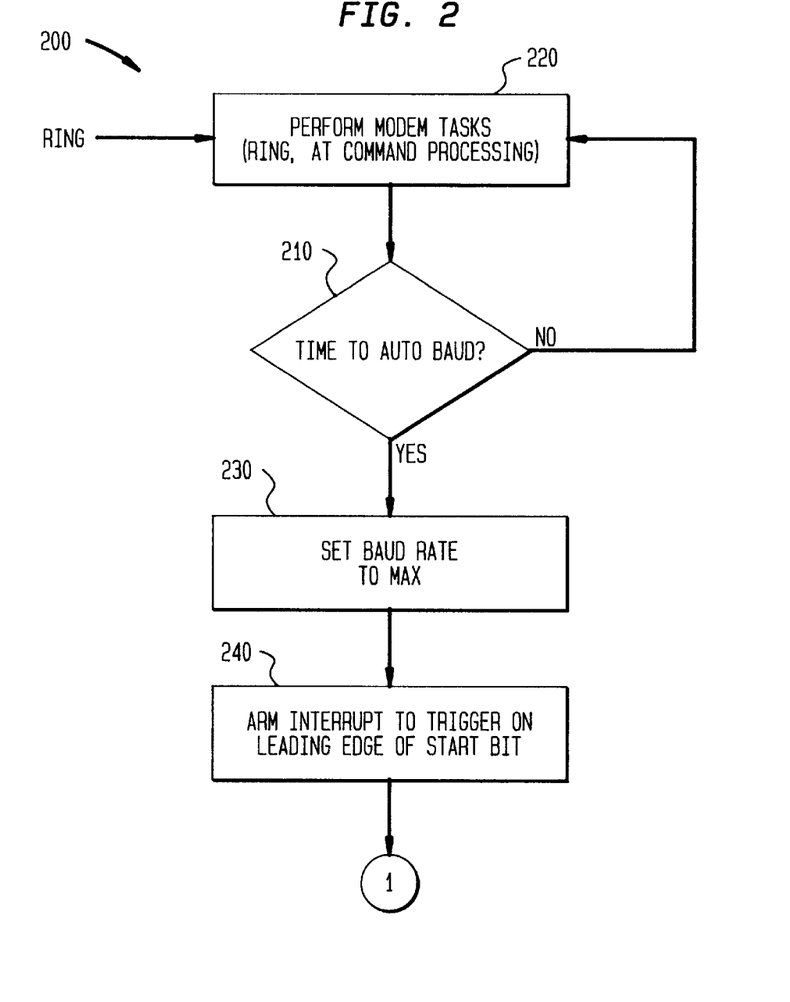
FIG. 2 is a functional flowchart of a autobauding method in response to a ring from a data terminal in accordance with the present invention.
Figure 3:
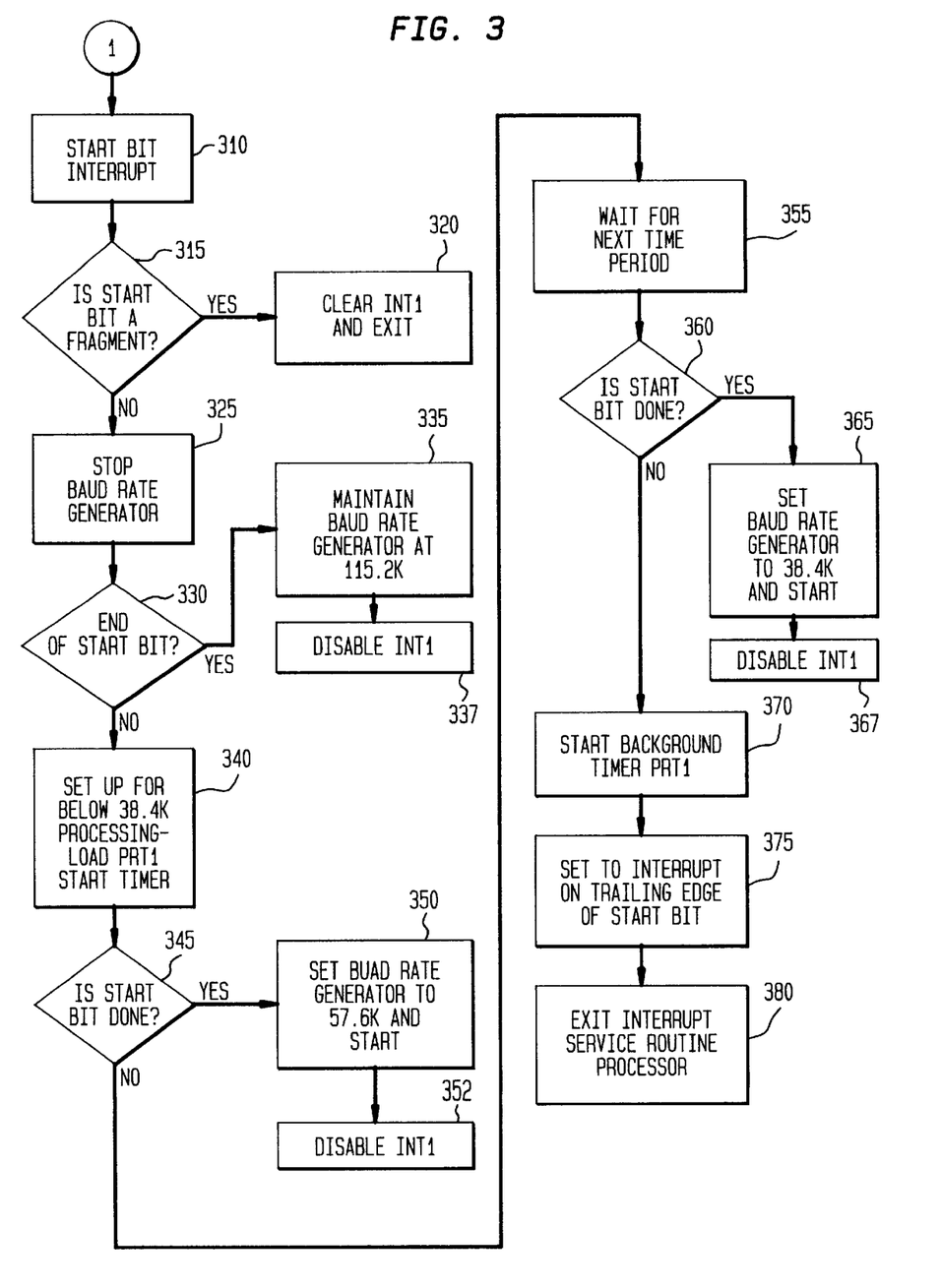
FIG. 3 is a functional flowchart of a autobauding method in response to a start bit in a data stream in accordance with the present invention.
Figure 4:
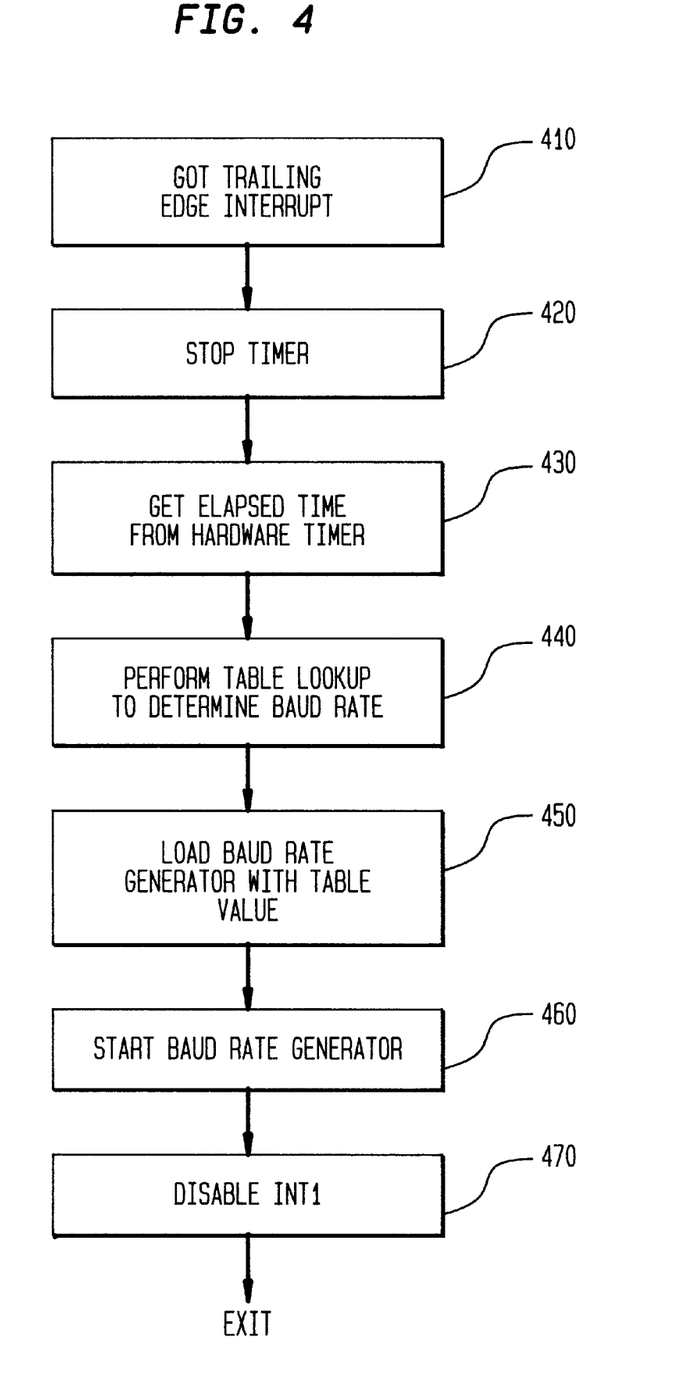
FIG. 4 is a functional flowchart of an autobauding method when the actual baudrate is below 38.4 kbits/sec in accordance with the present invention.

Referring now to FIGS. 2–4, and Tables 1 and 2, an operational overview of the present invention is presented. Further explanations of some of the steps are presented following the overview so as to maintain the overall flow of the presentation. The method of the present invention must first determine if data communication device 100 is in the autobaud mode (step 210) (Table 2). As further detailed below with respect to Tables 3 and 4, the autobaud mode represents a steady state condition for data communication device 100. This state represents an idle mode, as compared to the connecting mode, when data is being transferred between data communication device 100 and a data terminal (step 220). If data communication device 100 is in autobaud mode, preload register 130 initializes BRG 140 to the highest achievable baudrate, for example, 115.2 kbits/sec (step 230). In preparation for measuring the incoming baudrate, ISR processor 125 is armed to trigger on the leading edge (negative going edge) of the start bit (step 240).

TABLE 1

Autobaud_Int

BEGIN
/* There are two serial communication controllers used in
the ESCC (Enhanced Serial Communications Controller)
integrated in the z80182 microcontroller and the EASCI (Enhanced
Asynchronous Serial Communications Interface) of the z80189.*/

TABLE 1-continued

Autobaud_Int

Save contents of the z80 registers used herein (uses
high speed stack instruction);
IF (looking for leading edge)
THEN
/***********************************************
**INITIAL INTERRUPT- BRG HAS ALREADY
BEEN PROGRAMMED FOR 115.2K.
**ONCE A START BIT HAS BEEN SEEN AT
THIS RATE, THE BRG IS DISABLED.
**UNTIL THE NEW BAUDRATE IS
DETERMINED AND THEN THE BRG IS
**RE-ENABLED AT THE NEW RATE.
***********************************************/
    Set up some z80 registers for aid in
    performing the following tasks;
/**************************************
    CHECK TO SEE IF IT IS AN
    ACTUAL START BIT (AND NOT
    A FRAGMENT OF ONE)
**************************************/
    IF (start bit NOT still present)
    THEN
        /************************
        THIS IS NOT A FULL LENGTH
        START BIT, IGNORE IT AND
        GET OUT
        ************************/
        reset interrupt;
        increment and error counter;
        restore registers and RETURN,
    ENDIF
    Stop timer 1 (PRT1);
    /*PREPARE TO LOAD IT WITH
    0XFFFF*/
    Stop baudrate generator;
    /* IT IS NOW TIME TO CHECK
    FOR 115.2K (multiple sample points)*/
    IF (Star bit NOT Present)
    THEN
        /**********************
        ** BAUDRATE IS 115.2K
        PREPARE TO RECEIVE
        CHAR AT THIS RATE
        **********************/
        Re-enable BRG;
        Disable AutoBaud interrupt
        until command is processed;
        Restart timer 1;
        /*Must be free running for other
        reasons; This timer must be
        allowed to free-run in the Z80189
        microcontroller for there are two
        bits in the Timer Control Register
        that are used to signal a control
        signal to the data terminal and this
        control signal (DCD) can only be
        changed as PRT1 toggles through
        0.*/
        Set GOT_STARTBIT variable to
        signify start bit found;
        /*The variable GOT_STARTBIT is
        used in the receive side serial
        communications channel to
        indicate a start bit has been
        found and the first character
        of the Hayes Attention characters,
        the "A", is expected.*/
        Save the baudrate value
        found in a variable;
        Restore registers and
        RETURN;
    ELSE
        /* LOOK FOR 57.6K*/
        /***************
        TIMER 1 WILL BE
        PRELOADED AND
        STARTED HERE IN CASE TABLE 1-continued Autobaud_Int

```
            IT IS NEEDED FOR THE
            LOWER BAUDRATES. IT
            IS NOT USED FOR 38.4K
            AND ABOVE.
            ***************/
            Load timer 1 with 0xffff and
            re-start it;
            Prepare to restart BRG;
            /* It is now time to check for
            57.2K [multiple sample
            points]*/
            IF (Start bit NOT present)
            THEN
                /* BAUDRATE IS
                57.6K*/
                Load BRG lower byte
                with value for 57.6K;
                Re-start BRG;
                Disable AutoBaud
                interrupt until command is
                processed;
                Set GOT_STARTBIT
                variable to signify
                start bit found;
                Save the baudrate value
                found in a variable;
                Restore registers and
                RETURN;
            ELSE
                /* LOOK FOR 38.4K*/
                Load BRG lower byte
                with value for 38.4K;
                Perform some NOOPs
                for time synchronization;
                /* IT IS NOW TIME
                TO CHECK FOR
                38.4K [multiple
                sample points)*/
                IF (Start bit NOT
                present)
                THEN
                    /* BAUDRATE IS
                    38.4K */
                    Re-start BRG;
                    /* PROGRAMMED
                    FOR 38.4K ABOVE */
                    Disable AutoBaud
                    interrupt until command
                    is processed;
                    Set GOT_STARTBIT
                    variable to signify
                    start bit found;
                    Save the baudrate
                    value found in a
                    variable;
                    Restore registers and
                    RETURN;
                ELSE
/***************
BAUDRATE IS LESS THAN 38.4K
SET UP FOR TRAILING EDGE
INTERRUPT.
************/
                Set variable to look
                for trailing edge of
                INT1;
                Program INT1 to
                interrupt on rising
                edge;
                Restore registers and
                RETURN;
                ENDIF
            ENDIF
        ENDIF
    ELSE
        /*************************
        This is the trailing edge interrupt of
```

TABLE 1-continued

Autobaud_Int

```
        the start bit for 19.2K and below
        baudrate measurements. The PRT1
        timer is used to determine the
        baudrate.
        ***************************/
        Read current timer values of PRT1;
        Perform a table lookup to find the
        associated baudrate;
        Program the high and low bytes of
        the BRG for this value baudrate;
        Enable the BRG;
        Save the baudrate value found in a
        variable;
        Disable AutoBaud interrupt until
        command is processed;
        Set GOT_STARTBIT variable to
        signify start bit found;
        Restore registers and RETURN;
    ENDIF
END
```

TABLE 2 z80_start_autobaud()

```
BEGIN
    /********************************
    Initialize variables and set baud rate
    generator to 115.2K
    This routine is called after z80_chk_autobaud() (Table 3)
    determines that it is time to start searching for the next
    command input from the data terminal. It sets some
    autobauding parameters, re-enables the autobauding
    interrupt and starts up the BRG again. This routine must be
    called with interrupts disabled since it is also called from
    the EASCI ISR. Also this routine is heavily dependent on
    the type of underlying hardware serial communications
    channel used since it loads registers of the communications
    subsystem employed.
    *********************************/
    Set autobauding variable to ON state;
    Stop baud rate generator;
    Set BRG counter to 115.2K;
    Start BRG;
    Point interrupt vector to table for command
    mode ISRs; /* INT2 in particular */
END
```

When the leading edge of a start bit is received by data communication device 100, it triggers high priority, non-preemptive ISR processor 125 through an interrupt signal, such as INT1 (step 310). As explained below, INTI interrupt has to be the highest priority and a non-preemptive interrupt so as to minimize response latency. Interrupt processor 125 determines first whether the data triggering the interrupt was really a start bit or a fragment (step 315). If it is a fragment, then the method rearms the interrupt and exits (step 320). If it is a start bit, then ISR processor 125 suspends the operation of BRG 140 (step 325) and the width of the start bit is measured to determine the incoming baudrate (step 330).

The start bit measurement by ISR processor 125 is accomplished by using the execution times of the microprocessor instruction set and the clock speed of processor 120. Using both of these parameters as guidelines, as well as the length of the start bit at the various standard baudrates, e.g., 115.2 kbits/sec, 57.6 kbits/sec, 38.4 kbits/sec, etc., instructions from the microprocessor instruction set are carefully selected to meet the processing requirement. That is, the execution times of the selected instructions are used to determine the width of the start bit in the time allowed for each baudrate. In other words, a kind of polling mode is used in ISR processor 125 to periodically examine the incoming data terminal receive line to ascertain when the start bit has been completely received. Moreover, the instructions selected perform necessary background processing such as setting up registers and timers. In effect, by parsing out the background processing to match the required polling time for a specific baudrate, all start bit measurements are accomplished prior to the end of the first character. To account for interrupt jitter and small differences in oscillator frequencies from personal computer to personal computer, the method must be robust enough to compensate for small changes in the width of the start bit. To offset both effects, the sampling for the end of a start bit is repeated more than once. That is, multiple samples are taken prior to, at, and after the calculated polling time.

Figure 5:
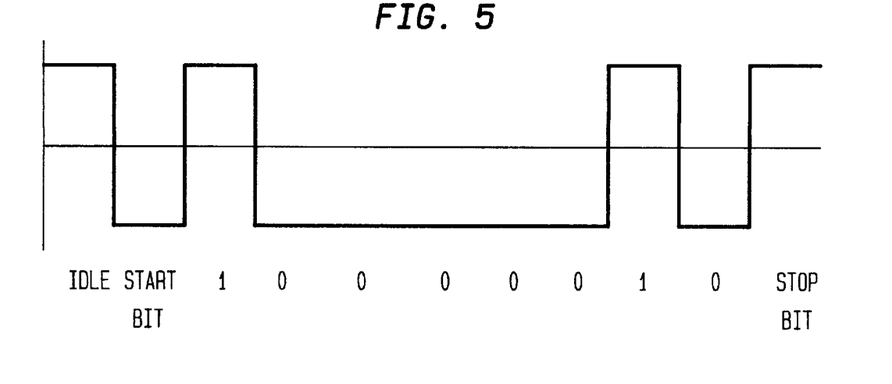
FIG. 5 is an illustrative data stream in accordance with the present invention.

As noted above, once the width of the start bit is known, then the incoming baudrate is also known. As such, if at step 330, the end of the start bit has been reached then BRG 140 is maintained at the previously set highest baudrate to permit receiving the rest of the character (step 335). In addition, INT1 is disabled. That is, the incoming baudrate was determined by ISR processor 125 to be the initially set highest baudrate. The method then insures that the received character is an "A" (or an "a"), which is the first character of all Hayes modem commands. If so, then the rest of the command is received at the set baudrate and presented to the higher level firmware for parsing and subsequent action. If this character is not an "A" (or "a"), or if an RS-232 frame error occurs on the data terminal receive input channel, then the received character is discarded and the autobauding mode of operation is re-entered. Referring to FIG. 5, note that the first character of all modem commands being an "A" or "a" has a necessary measurement characteristic for the start bit. Namely, that the next bit received after the start bit is opposite in polarity.

If the end of the start bit is not established at step 330, then other background processing is executed, such as loading the PRT1 timer for baudrate determinations below 38.4 kbits/sec (step 340). At the completion of this background processing, the method again polls the start bit to determine if it has been completely received (step 345). If the end of start bit has been determined, then BRG 140 is set to, in this instance, 57.6 kbits/sec (step 350) and the INT1 interrupt is disabled (step 352). If the start bit is still present, the polling is repeated after the next interval (steps 355 and 360). Again, if no start bit is present, then BRG 140 is set (step 365) and INT1 is disabled (step 367). In an one embodiment of the present invention, this is repeated until the incoming baudrate is determined.

In the exemplary embodiment of the present invention, if the start bit is still present, then processing is initiated for baudrates of 19.2 kbit/sec and below. The timer PRT1, which was loaded previously, is now started (step 370). The INT1 interrupt is now set to interrupt on the trailing edge of the start bit (step 375). After executing these instructions, ISR processor 125 is exited (step 380), with INT1 now being armed for the trailing edge of the start bit. As such, there are actually two INT1 processes. At the lower baudrates, the previously loaded Programmable Reload Timer Channel 1 (PRT1) is used for determining the length of the start bit. As mentioned, instead of staying in the ISR processor 125 until the incoming baudrate determination is made, PRT1 comes into play for below 38.4 kbit/sec baudrates. This timer is loaded by the initial ISR processor 125 processing to countdown from 0xffff (hexadecimal) (step 340). The INT1 interrupt detecting hardware is then reprogrammed to interrupt on the trailing, or positive going edge of the start bit, and the first ISR is exited. When the second interrupt occurs, the number of counts in PRT1 is used to determine the baudrate. This prevents the firmware from polling with interrupts off an unnecessarily long time. Of course at the higher baudrates, especially 115.2 K it is not only desirable to stay in ISR processing 125 to determine the start bit width, it is necessary for there is no time to do otherwise. That is, data loss would occur.

Referring now to FIG. 4, if the trailing edge of the start bit is detected (step 410), then INT1 interrupts ISR processing 125 and timer PRT1 is stopped (step 420). The elapsed time is obtained from the timer (step 430) and a table lookup is performed to determine the incoming baudrate (step 440). The baudrate from the table is loaded into BRG 140 (step 450). As before, BRG 140 is then started (step 460) and INT1 is disabled (step 470).

As mentioned above, a critical issue is to determine when the above autobauding process is performable. As stated above, data communication device 100 has two operational modes, a connecting mode and a command mode. The connecting mode is when the actual transfer of data occurs between data communication device 100 and a data terminal. The command mode is an idle mode corresponding to when data communication device is waiting for a communication connection. Since activity during the command mode is generally minimum, this is an ideal time to determine the incoming baudrate and in turn, to set the BRG to the actual baudrate. As such, the autobaud mode of the present invention coincides with the command mode and is the steady state mode of data communication device 100.

The issue of when to autobaud or more precisely, of when to enter and exit out of the autobaud mode, is discussed with reference to FIG. 2 and Tables 3–4. Referring back to FIG. 2, there is depicted a flowchart 200 which details how the present invention determines if it is in autobaud mode. The method iteratively polls itself to determine if it should be in autobaud mode (step 210). An exemplary embodiment of firmware pseudocode of step 210 is listed in Table 3. As evident from the listing, this firmware implementation is used to determine when it is time to start autobauding, i.e., when to transition back to the autobaud or command mode state. Data communication device 100 is in connecting mode (step 220) when it is performing specified tasks.

TABLE 3 z80_chk_autobaud ()

```
BEGIN
    /***********************************
    Are we in command mode?
    Are we in VoiceView command mode?
    ***********************************/
    IF (state variables indicate start autobaud)
    THEN
        /***********************************
        **ANYMORE INCOMING OR
        OUTGOING CHARS QUEUED?
        **IS THE HW COMM. CHANNEL
            QUIESCENT?
        ***********************************/
        IF (NOT more chars in receive or
        transmit queue && Hardware
        Transmit Register Empty)
        THEN
        /***********************************
        ** For the z80189 we must guarantee that the last
        char has been shifted out of the EASCI TX REG we
```

TABLE 3-continued z80_chk_autobaud ()

re-examine the input buffer again to try to prevent an
inadvertent autobaud. Note that z89_Delay () adds
the appropriate delay for the current baudrate.
\*\*\*\*\*\*\*\*\*\*\*\*\*\*\*\*\*\*\*\*\*\*\*\*\*\*\*\*\*\*\*\*\*\*/
if defined (Z189)
       IF (z89_delay () && input
          buffer still empty)
       THEN
endif
          disable_interrupt ();
           z80_start_autobaud ();
          enable_interrupt ();
       ENDIF
    ENDIF
  ENDIF
END Connecting mode is also entered when data communication device 100 has an unsolicited report for the data terminal. For example, autobaud mode will be exited in response to a ring signal, if the modem is currently autobauding, and the RS-232 channel is quiescent (e.g., not currently sending or receiving any data). In this case, processor 120 will stop the autobaud determination, set BRG 140 to the previous baudrate and convey the unsolicited message at that previous rate. An exemplary embodiment of this firmware is listed in Table 4. As stated above, this routine is executed whenever an unsolicited message is required to be presented to the data terminal. In addition to ring detection, certain operating systems can solicit the plug and play (PnP) enumeration sequence. Since this sequence is sent to the data terminal at 1200 baud, the routine must be called to prepare the communication channel for the response.

TABLE 4

80_stop_autobaud()

BEGIN
    /\*\*\*\*\*\*\*\*\*\*\*\*\*\*\*\*\*\*\*\*\*\*\*\*\*\*\*\*\*\*\*\*\*\*
      \*\*Initialize variables and set baudrate
        generator to 115.2K
    \*\*\*\*\*\*\*\*\*\*\*\*\*\*\*\*\*\*\*\*\*\*\*\*\*\*\*\*\*\*\*\*\*\*/
    Set autobauding variable to OFF state;
    Stop BRG;
    Set BRG counter to last known baudrate;
    /\* stored in a variable named "s_62" \*/
    Start BRG;
    Point interrupt vector to table for on-line mode ISRs;
END The other half of the question of when to start autobauding is less straightforward. It is equivalent to asking when is the modem in command mode (autobauding is allowed), versus when is the modem on-line (connected to another modem over the telephone network). Once a connection is established, the autobaud mode is exited and data is pumped to and from the data terminal at the last observed baudrate. Moreover, even when data communication device is in command mode, autobauding is performed only on the first "A" received. Data communication device then waits for the entire command (or commands) to be entered, processed and responded to before transitioning back to the autobauding state.

In an exemplary embodiment of the present invention, although a complete set is not presented, there are certain state variables that the application domain uses in decision making that are also available for checking when to be in autobauding mode. Two such variables are "at_state" and "x_modem_state." At_state is very useful for it tracks the receiving of AT commands directly if the modem is already in command/autobaud mode. The states are loosely defined as idle or looking for "A" if the other state variables are favorable, looking for "T," and in the middle of a command. However, as implied above, At_state being idle does not map directly into looking for "A." The x_modem_state variable must also be considered. This variable has several states. Currently, the two states of interest for determining command mode are "MS_IDLE" and "MS_RING_INDICATE." Once the right state is determined, it is still necessary to observe other conditions such as: are there more characters in the receive buffer from the data terminal, are there more characters in the send buffer to the data terminal, and has the last character sent been fully shifted out of the serial channel. In this last instance, the character being fully shifted out cannot directly be determined in certain microcontrollers. As such, a worst case delay per baudrate has been entered into a table and is added on at the end. Since the baudrate generator is reprogrammed to the highest baudrate, which may not be the current baudrate, the affect on current characters being received from or delivered to the data terminal is probably harmful.

A necessary condition for implementing the above autobauding process is that the interrupt INT1 be the highest priority interrupt and in addition, be a non-preemptable interrupt. Although this does not present a problem with respect to processors which have prioritized interrupts and a non-preemptive scheme, this will cause complications when utilizing processors not having the above features. In the exemplary embodiment of the data communication device, z80 based microprocessors are utilized for the controllers. As such, complications in autobauding arise when the z80 processor is not able to immediately respond to the INT1 interrupt. This occurs when some other interrupt is currently being serviced or some application firmware module has interrupts masked for critical region protection. Since the start bit at 115.2 K is less than 8.7 microseconds wide, the latency in responding to the INT1 interrupt has to be kept very low (well under 2 microseconds). As such, the implementation utilized in the z80 has been designed to minimize the response time to the INT1 interrupt.

The following examples illustrate specific implementations to resolve the issue presented. For example, the channel 0 periodic timer (PRT0) interrupts once every 20 milliseconds to update a global event counter used throughout the application firmware. Although this interrupt occurs rarely at the beginning of a command, nevertheless if it occurs an entire command is lost. The exemplary ISR processor 125 has therefore been implemented to re-enable the INT1 interrupt as soon as possible. A dedicated z80 internal register (the A' register) is utilized to facilitate low latency. Another issue is the datapump interrupt (INT2), which occurs in command modem or autobauding mode if, for example, a VoiceView application is running. In this case virtually hundreds of queries are made to the datapump, each causing an interrupt in the response phase. Therefore, the Datapump ISR has been redesigned to re-enable INT1 as soon as possible when in the autobauding state. Since the PRT0 interrupt was given the only unused register in the z80 register set to minimize interrupt latency, some other means had to be found to reduce latency in this instance. The solution employed here was to take advantage of the paging nature of the z80 interrupt architecture. When in command mode a new vector page is introduced which is identical in every respect to the original page except for INT2. In this instance, the vector page points to a new routine that re-enables the INT1 as soon as possible. This adds some latency to the Datapump interrupt but since we are in command mode, it is not performance affecting. The quickest response time to interrupts in the z80 is to use the stack instruction to preserve the application registers. Since the autobauding interrupt permits the preemption of the datapump interrupt in command mode, all of the registers must be stacked instead. Critical region protection by masking interrupts was also revisited due to the stringent requirements of autobauding. Critical regions are shared region resources which include the task and interrupt environments. A new macro was introduced to mask the INT0 and INT2 interrupts only, thereby allowing the INT1 autobauding interrupt to preempt the critical region. Naturally, no variable used by ISR processing 125 can be modified in this critical region.

In sum, at initialization, and before every command from a data terminal, firmware within the data communications device sets the serial communications controller to accept input characters at the highest allowed baudrate. On receipt of an actual character from the data terminal, the real baudrate is measured and adjusted to dynamically. An INT1 interrupt along with an associated ISR processor suspends the operation of the BRG, measures the start bit and programs the BRG to receive the rest of the incoming command at the determined baudrate.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. A data communication device for automatically detecting and adjusting to an incoming baudrate from a data terminal, said device comprising:
    a baudrate generator for controlling a rate at which data is transferred to and from the device;
    a controller, said controller setting said baudrate generator at a highest available baudrate;
    said controller suspending said baudrate generator upon detection of a start bit received at said highest available baudrate;
    said controller polling for a duration of said start bit at a polling interval based on a controller generated time reference, said controller generated time reference being an execution time of a set of selected background processing instructions;
    said controller thereby determining a width of said start bit to determine an actual rate of said incoming baudrate; and
    said controller setting said baudrate generator to said actual baudrate and restarting said baudrate generator to receive a remaining data at said actual baudrate.

2. The device according to claim 1, wherein said selected instruction based polling operates to establish a timer that is utilized to measure said duration when said actual baudrate is below a predetermined threshold rate.

3. The device according to claim 1, wherein said selected instructions contemporaneously perform background processing tasks.

4. The device according to claim 3, wherein multiple samples of said start bit are taken.

5. The device according to claim 1, wherein a timer is utilized to measure said width when said actual baudrate is below a predetermined threshold rate.

6. The device according to claim 1, wherein said controller includes an interrupt processor for suspending said baudrate generator when a first interrupt is triggered by a leading edge of said start bit.

7. The device according to claim 6, wherein said interrupt processor measures said width by polling for a presence of said start bit, a time for said polling being measured by an execution time of background processing instructions, said time corresponding to a plurality of baudrates.

8. The device according to claim 7, wherein said interrupt processor is configured for a second interrupt, said second interrupt triggering on a trailing edge of said start bit when said actual baudrate is lower than a predetermined threshold rate.

9. The device according to claim 8, wherein said controller includes:
    a lookup table; and
    a timer for measuring an elapsed time when said interrupt is triggered on said trailing edge, said elapsed being compared against said lookup table to determine said actual baudrate.

10. The device according to claim 9, wherein said first interrupt and second interrupt are a highest priority interrupt and are non-preemptable.

11. The device according to claim 1, wherein said device has a connecting state and an autobauding state, said device exiting said autobauding state and setting said baudrate generator to a previous baudrate when said device has to transmit an unsolicited report to said data terminal.

12. A data communication device for automatically detecting and adjusting to an incoming baudrate from a data terminal, said device comprising:
    a baudrate generator for controlling a rate at which data is transferred to and from the device;
    a processor for setting said baudrate generator at a highest available baudrate;
    said processor suspending said baudrate generator upon detection of a start bit received at said highest available baudrate;
    said processor polling for a duration of said start bit at a polling interval based on a processor generated time reference, said controller generated time reference being an execution time of a set of selected background processing instructions;
    said processor thereby determining an actual baudrate of said incoming baudrate; and
    said processor setting said baudrate generator to said actual baudrate and restarting said baudrate generator to receive a remaining data at said actual baudrate.

13. The device according to claim 12, wherein said selected instruction based polling operates to establish a timer that is utilized to measure said width when said actual baudrate is below a predetermined threshold rate.

14. The device according to claim 12, wherein multiple samples of said start bit are taken.

15. The device according to claim 12, wherein a timer and a lookup tables are utilized to measure said actual baudrate when said incoming baudrate falls below a predetermined threshold rate.

16. The device to claim 12, wherein said processor includes an interrupt processor for suspending said baudrate generator when a first interrupt is triggered by a leading edge of said start bit.

17. The device according to claim 16, wherein said interrupt processor measures said width by polling for a presence of said start bit, a time for said polling being measured by an execution time of background processing instructions, said time corresponding to a plurality of baudrates.

18. The device according to claim 16, wherein said interrupt processor is configured for a second interrupt, said second interrupt triggering on a trailing edge of said start bit when said incoming baudrate falls below a predetermined threshold rate.

19. The device according to claim 18, wherein said first interrupt and second interrupt are a highest priority interrupt and are non-preemptable.

20. The device according to claim 12, wherein said processor has a connecting state and a command state, said processor exiting said command state and setting said baudrate generator to a previous rate when said device has to transmit an unsolicited report to said data terminal.

21. A method for automatically detecting and adjusting to an incoming baudrate from a data terminal, said method comprising the steps of:

setting a baudrate generator at a highest available rate for transferring of data with said data terminal;

suspending said baudrate generator upon detection of a start bit received at said highest available baudrate;

measuring a width of said start bit, said step of measuring further including the step of polling for a duration of said start bit at a polling interval based on a generated time reference, said generated time reference being an execution time of a set of selected background processing instructions;

determining an actual baudrate of said incoming baudrate, based on said measured width of said start bit;

setting said baudrate generator to said actual baudrate; and, restarting said baudrate generator to receive remaining data at said actual baudrate.

22. The method according to claim 21, wherein said selected instruction based polling operates to establish a timer that is utilized to measure said width when said actual baudrate is below a predetermined threshold rate.

23. The method according to claim 21, wherein said step of determining includes the step of obtaining multiple samples of said start bit.

24. The method according to claim 21, wherein said step of determining includes the steps of:

starting a timer to measure said actual baudrate for said incoming baudrate falling below a predetermined threshold rate;

obtaining an elapsed timer value when an interrupt is triggered by said start bit; and looking up a value in a lookup table to determine said actual baudrate.

25. The method according to claim 21, wherein said step of setting includes the step of arming a first interrupt to trigger on a leading edge of said start bit.

26. The method according to claim 25, wherein said step of suspending includes the step of triggering a first interrupt upon receipt of a leading edge of said start bit and stopping said baudrate generator.

27. The method according to claim 26, further including the steps of arming a second interrupt for triggering on a trailing edge of said start bit for said incoming baudrate falling below a predetermined threshold rate.

28. The method according to claim 27, wherein said first interrupt and second interrupt are a highest priority interrupt and are non-preemptable.

29. A data communication device for automatically detecting and adjusting to an incoming baudrate from a data terminal, said device comprising:

a baudrate generator for controlling a rate at which data is transferred to and from said device;

a controller, said controller setting said baudrate generator at a highest available baudrate;

said controller suspending said baudrate generator upon detection of a start bit received at said highest available baudrate;

said controller measuring a width of said start bit to determine an actual rate of said incoming baudrate by polling for a duration of said start bit;

said controller determining a polling interval from execution times of a series of selected instructions to determine said incoming baudrate for said incoming baudrates greater than or equal to a predetermined threshold rate; wherein each of said series of selected instructions is marked by an execution time corresponding to ones of a plurality of baudrates greater than or equal to said predetermined threshold rate;

said controller performing selected instructions to start a timer for counting baudrates less than said predetermined threshold rate;

said controller determining said incoming baudrate from said timer for said incoming baudrates less than said predetermined threshold rate; and said controller setting said baudrate generator to said actual baudrate and restarting said baudrate generator to receive a remaining data at said actual baudrate.

* * * * *